June 8, 1965 P. P. SPOLSINO 3,187,481
SEALING APPARATUS

Filed Sept. 30, 1963 3 Sheets-Sheet 1

June 8, 1965   P. P. SPOLSINO   3,187,481
SEALING APPARATUS
Filed Sept. 30, 1963   3 Sheets-Sheet 3

3,187,481
SEALING APPARATUS
Peter P. Spolsino, Revere, Mass., assignor to W. R. Grace & Co., Duncan, S.C., a corporation of Connecticut
Filed Sept. 30, 1963, Ser. No. 312,696
1 Claim. (Cl. 53—135)

This application is a continuation-in-part of U.S. application Serial No. 163,168 filed December 29, 1961 (now U. S. Patent 3,111,794). The entire disclosure of application Serial No. 163,168 is incorporated herein by reference.

This invention relates to bag sealing and more particularly, to an apparatus and a method for sealing the gathered end of a thermoplastic bag so as to obtain an air tight seal.

A common method of sealing the open end of thermoplastic bags requires that opposite sides of the open mouth be brought together and that sufficient heat be applied to the thermoplastic material to fuse the two sides together. This necessarily results in a rather wide closure extending the width of the package which, while suitable for packaging some products, is equally unsuitable for others. For example, when packaging whole poultry or primal meat cuts, it is preferred that the bag, including the sealed area, closely conform to the product. Conventional heat sealing, therefore, produces seals that lie some distance from the end of the product and are relatively straight, loose fitting seals.

Another method of closing bags and one that permits the sealed area to more closely conform to the product involves the application of a deformable metal band about the gathered end of the bag. The clip can be applied to the gathered end of the bag in close proximity to the bagged product. With the development of clip applying devices and suitable clips, it is now possible with this method to quickly obtain reliable seals. Several problems exist in connection with clip sealing, the most serious of which is the difficulty in obtaining an air tight closure. The gathered neck of the bag about which the clip is applied has a myriad of channels created by the folding of the bag through which air can pass into the interior of the bag. To close off these channels, it is necessary to apply the clips tightly around the gathered neck of the bag. Because the bags of thermoplastic material are relatively fragile, the use of sufficient pressure to close the air passages is likely to cause the clip to tear into the bag—destroying the integrity of the closure. The problem is even more serious with large bags, since correspondingly greater pressures must be applied to seal the bag.

While it would theoretically be possible to heat fuse the gathered neck of a thermoplastic bag, this is not practical, since the fused material must be held under restraint or otherwise supported while the material is cooling and solidifying. A not inconsiderable length of time must elapse before the seal acquires any strength. The time required to cool the fused thick mass of material to a point where the heat seal will become self-supporting has proven to be of such long duration that it has not been considered economically practical to seal bags in this manner.

It is an object of the present invention to provide a method for obtaining an air tight seal on thermoplastic bags of any size, which seal will be relatively small and conform to the product. It is a further object to provide apparatus which will quickly and positively produce an air tight seal.

Other objects and advantages of the present invention will become apparent from the following detailed description of the invention taken in conjunction with the accompanying drawings wherein.

Figure 1:
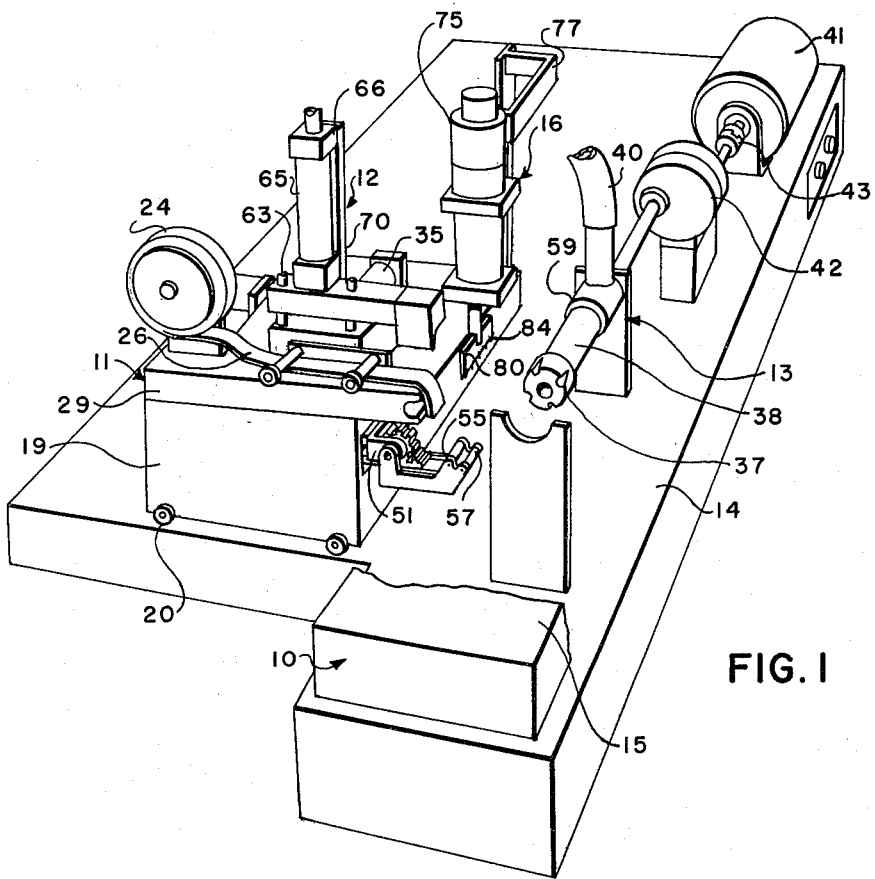
FIGURE 1 is a perspective view of the apparatus of this invention.

The presently preferred embodiment of the apparatus of the invention comprises in general a product support unit 10, a tape dispensing and clamping unit 11, a bag cut-off and sealing unit 12, an evacuating unit 13 and a tape cut-off unit 16. All units are placed upon a work surface 14, e.g., a platform or floor.

The product support unit 10 is illustrated as a stationary table 15. If desired the support unit could comprise a conveyor which delivers the bagged product (e.g. whole ham 17 in thermoplastic bag 18) from a product bagging station (not shown).

The tape dispensing and clamping unit and the bag cut-off and sealing unit are both mounted on a common carriage 19. This carriage rides on the work surface 14 and is reciprocally movable thereon. In the illustrated apparatus the carriage 19 is mounted on a plurality of wheels 20 and is moved to and fro by a carriage mover comprising an air operated cylinder 21, the piston rod 22 of which is secured to the back plate 23 of the carriage.

Figure 4:
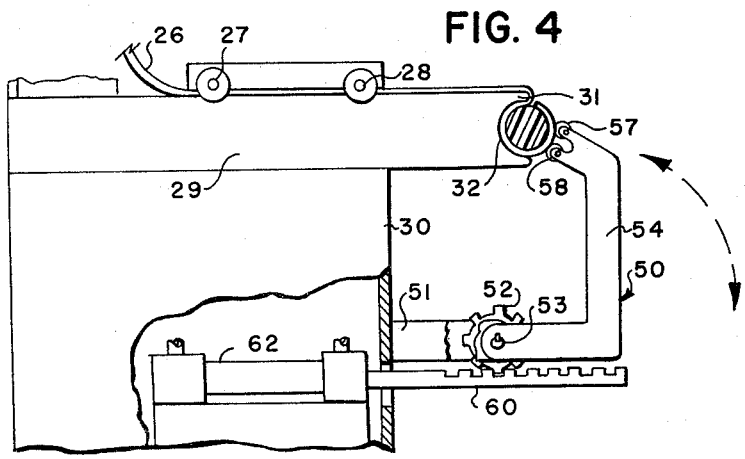
FIGURE 4 is a section taken on about line 4-4 of FIGURE 3, certain elements being broken away for better clarity.
Figure 2:
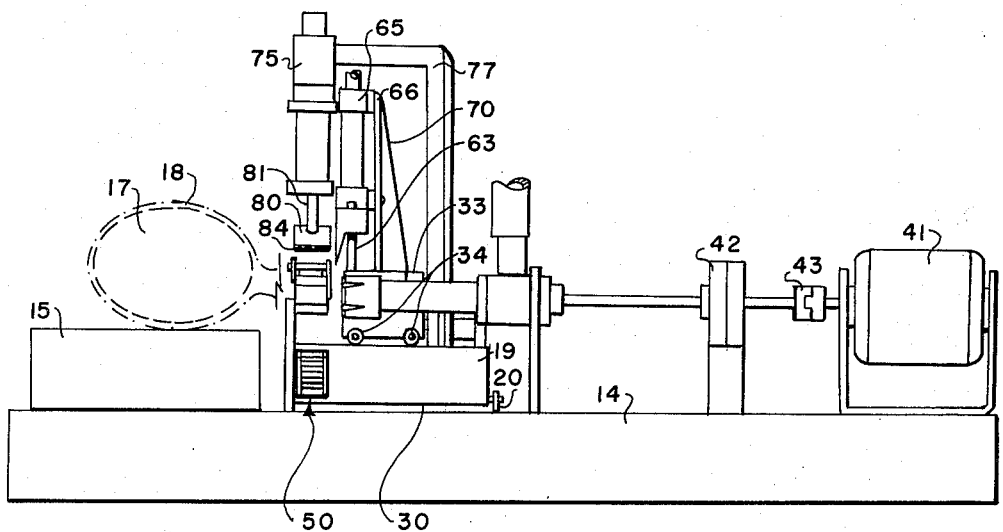
FIGURE 2 is a front elevational view of the apparatus of FIGURE 1.
Figure 3:
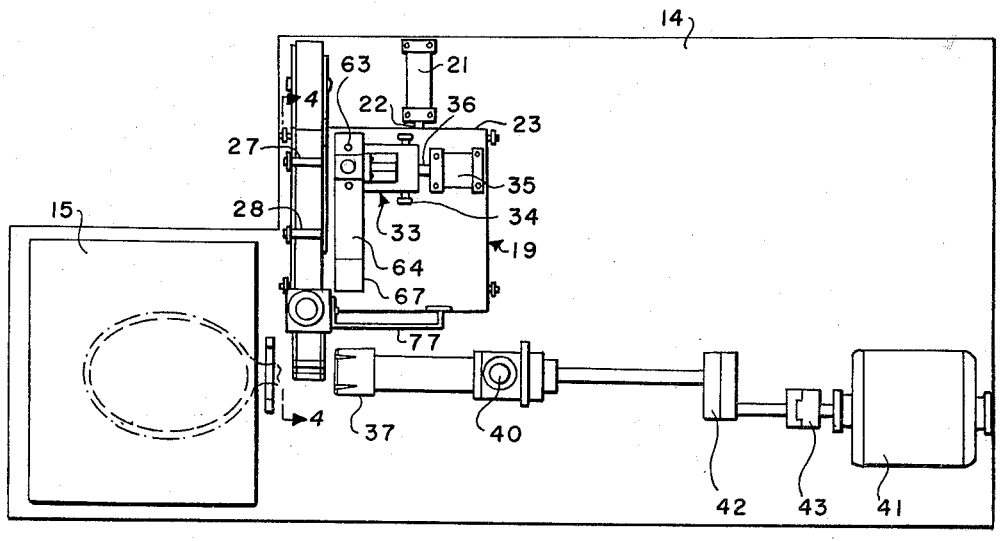
FIGURE 3 is a top plan view of the apparatus.

The tape dispensing and clamping unit 11 is fixedly secured on the top of movable carriage 19 adjacent the side closest to the product support table. The detailed construction of the tape dispenser is best seen in FIGURES 1 and 4, wherein it is seen that the unit comprises a supply roll 24 of pressure sensitive adhesive tape mounted in a conventional dispenser housing (not shown). The tape 26 is drawn from the supply roll with the adhesive side exposed. The tape is fed under the guide rolls 27, 28 mounted on elongated arm 29 which extends beyond the front side 30 of carriage 19. The face 31 of the extended end of arm 29 is grooved to form a saddle 32 therein.

The clamping device 50 in the illustrated apparatus is mounted on the forward face of carriage 19 directly below extended arm 29 of the tape dispenser. A U-shaped yoke 51 which is bolted or otherwise secured to the carriage face 30 supports the clamp. A pinion gear 52 is held between the legs of the yoke 51 by a shaft 53, the respective ends of which extend through the legs of the yoke a short distance. Clamp arms 54 and 55 are secured to the ends of the shaft 53. The gear and clamp arms are fixedly secured to the shaft so that rotation of the gear rotates the shaft, which in turn will move the clamp arms. The clamp arms are shaped in a suitable manner so that the outer free ends thereof will generally mate with the saddle 32 when the clamp is moved to operative position. Freely rotatable rollers 57 and 58 are mounted between the free end of the clamp arms in siutable manner.

The clamp is moved into operative position by means of a driven rack 60 which co-operates with the pinion gear 52. The rack is moved to and fro by an air cylinder 62, the piston of which is fixed to or integral with the rack 60.

The bag cut-off and fuse sealing unit 12 is mounted slightly behind the tape dispensing unit. In addition to moving to and fro together with the tape dispensing unit, the bag cut-off unit is mounted for movement toward and away from and in a direction generally perpendicular to the elongated arm 29 of the tape dispenser. In the illustrated embodiment this is accomplished by mounting the bag cut-off unit 12 on a second movable carriage 33 which is independently reciprocable on top of movable carriage 19. Carriage 33 is made movable by mounting it on a plurality of wheels 34. Reciprocal movement is obtained from a carriage mover comprising air cylinder 35 and piston rod 36 secured to the rear of carriage 33.

Near the forward top edge of the carriage 33 there are two knife guide rods 63. Knife bar 64 is bored out and mounted to ride up and down on the guide rods. A knife drive air cylinder 65 is mounted on support plate 66 between the rods. The plate 66 is fixedly secured to the top of carriage 33 and is maintained in generally fixed horizontal position by struts 70. The piston 67 of the cylinder is secured to the top of knife bar 64. The knife bar extends towards the forward side of the apparatus. The knife blade, per se, is secured to the extended end of the bar so that it is generally in the same vertical plane as the saddle groove 32 in the tape dispensing unit. The knife is designated 67 in the drawings.

The blade is heated in known manner by inserting cartridge heaters (not shown) therein. The heaters are connected to a suitable electric power source (not shown) via flexible electric power line 68 (shown in FIGURE 5). The knife blade is maintained hot at all times during operation of the machine. Suitable temperatures are from about 450° to 600° Fahrenheit, depending primarily upon the particular thermoplastic from which the bag 18 is made.

The evacuating unit 13 is constructed in known manner. It comprises in general, a vacuum nozzle 37 fixedly mounted on the end of rotatable conduit 38 which in turn communicates with vacuum chamber 39. Sub-atmospheric pressure is created in the chamber 59 via flexible hose 40 connected to a suitable evacuation device such as a vacuum pump (not shown). Conduit 38 (and thus nozzle 37) are rotated by connection to the motor 41 via a gear reducer 42 and clutch assembly 43.

The tape cut-off unit includes knife 80 which is secured to the end of piston 81 of air cylinder 75. Ordinarily this knife is in retracted position and is enclosed in a shield housing (not shown) for safety reasons. The air cylinder 75 which drives the knife is mounted on carriage 19 by a suitable support bracket 77. This bracket positions the tape cut-off knife several inches in front of the saddle groove 32 and in line with the extended arm 29 of the tape dispenser. The cutting edge 84 of the knife 80 is serrated to aid in making the transverse cut in the tape 26.

The actuation of the evacuating unit 13, the carriage 19, the bag cut-off unit 12, the carriage 33, and the tape cut-off knife 80 is performed in a timed sequence via conventional timing circuits and switches. The timing mechanisms and their operation are so well known in the art that detailed description thereof is not deemed necessary for purposes of understanding the present invention.

In operation, product (such as whole ham 17, or a turkey, chicken, primal meat cut, etc.) in a bag 18 of thermoplastic film (such as Saran, polyethylene, polypropylene, etc.) is brought to a rest position on support unit 10. The open neck of the bag is drawn over the vacuum nozzle 37 and held around the conduit 38. The vacuum pump (not shown) is turned on and operates until the bag is substantially evacuated.

The timing device is then activated. Its first operation is activation of the drive motor 41 to twist the nozzle 37 and make a twisted rope of the extended bag neck. Next the timer actuates air cylinder 21, moving carriage 19 forward until the twisted bag neck rests in saddle 32 in the arm of the tape dispenser. Prior to this tape is drawn from the supply roll for a distance sufficient to leave at least a short length draped over the end of arm 29 and thus hanging in front of the saddle.

The movement of the twisted bag neck into the saddle pushes the end of the tape into the saddle. The clamp unit 50 is simultaneously actuated and pushes the bag neck and tape firmly into the saddle.

At this point the timer again actuates the motor 41 so that the bag neck is further twisted. During this second twist the pressure exerted by clamp 50 is sufficient to make the tape adhere to the bag neck. Continued twisting causes further tape to be drawn from the supply roll and drawn tightly about the neck to form an encircling sleeve 45.

The motor 41 is deactivated and air cylinder 65 is activated, driving the heated bag cut-off knife 67 down and through the bag neck. This severs the excess bag material, leaving a short portion (e.g., one-fourth inch) of the bag neck extending behind the arm 29 of the tape dispenser. As soon as the cut is complete, the timer actuates air cylinder 35, so that the carriage 33 moves toward the tape dispenser.

Figure 5:
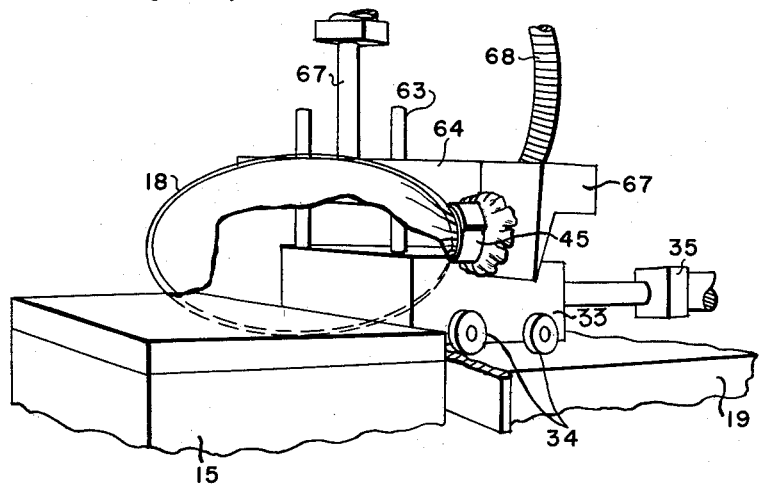
FIGURE 5 is a perspective view schematically illustrating certain steps in the operation of the apparatus.
Figure 6:
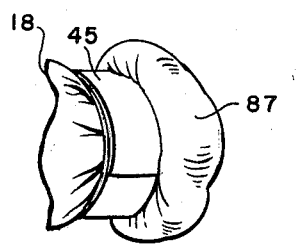
FIGURE 6 is a perspective view of the final seal.

Movement of the carriage 33 axially compresses the end of the bag between the hot knife 67 and the tape sleeve 45 (see FIGURE 5). In a very short time (e.g. 3 to 4 seconds for Saran films) the neck is fused into a solid mass 87. The clamp 50 holds the tape-encircled neck portion in place so that the end of the neck cannot move away from the hot knife.

The carriage 33 is then withdrawn and the bag cut-off knife is retracted. At the same time carriage 19 is withdrawn to its rest position, and the clamp 50 is returned to its normal position i.e., open. When carriage 19 reaches its rearward rest position air cylinder 75 is actuated, driving tape cut-off knife 80 downward to sever the tape an inch or so in front of the face 31 of the arm 29. The severed tape drapes over the face 31 in front of saddle groove 32 in readiness for the next cycle.

What I claim is:

Apparatus for sealing the open end of a thermoplastic bag comprising:
(a) a base,
(b) means mounted on the base for twisting a bag neck,
(c) a product support spaced from said twisting means,
(d) a first carriage mounted on the base and reciprocal toward and away from the twisting means in a line of travel generally normal to the twisting means,
(e) tape dispensing means mounted on the side edge of said first carriage closest to said product support and having a dispenser arm extending sufficiently to contact a bag neck on the twisting means when the carriage is closest to the twisting means,
(f) clamp means to temporarily hold the bag neck against the dispenser arm,
(g) a second carriage mounted atop the first carriage and reciprocal in line of travel generally normal to the line of travel of the first reciprocal carriage,
(h) a heated severing means mounted on said second carriage and adapted to sever excess portions of the bag neck extending beyond the clamped neck portion towards the twisting means and,
(i) cutting means secured to the first carriage and adapted to sever tape extending between the tape dispenser and the bag neck when the first carriage is retracted to its position remote from the twisting means.

References Cited by the Examiner

UNITED STATES PATENTS

| | | | |
|---|---|---|---|
| 2,841,935 | 7/58 | Krueger | 53—135 |
| 2,916,863 | 12/59 | Leighton et al. | 53—135 |
| 3,041,801 | 7/62 | Harrison | 53—39 X |
| 3,111,794 | 11/63 | Spolsino | 53—14 |

FOREIGN PATENTS 819,963  9/59  Great Britain.

FRANK E. BAILEY, *Primary Examiner.*

BERNARD STICKNEY, *Examiner.*